B. A. SCHRODER.
AUTOMATIC CONTROL MEANS FOR GAS BURNING HEATING SYSTEMS.
APPLICATION FILED JAN. 27, 1916.
1,280,872.
Patented Oct. 8, 1918.
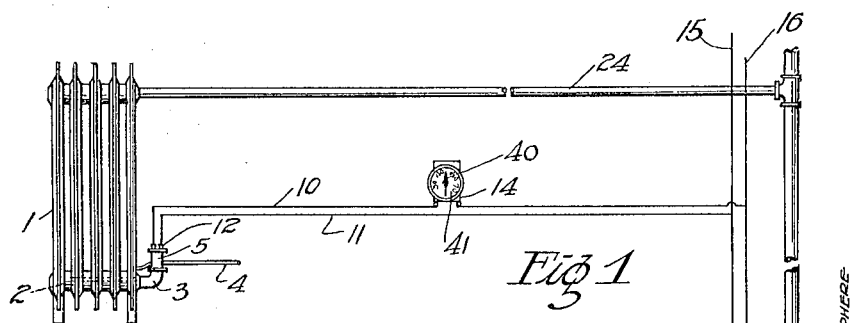
*Fig. 1*
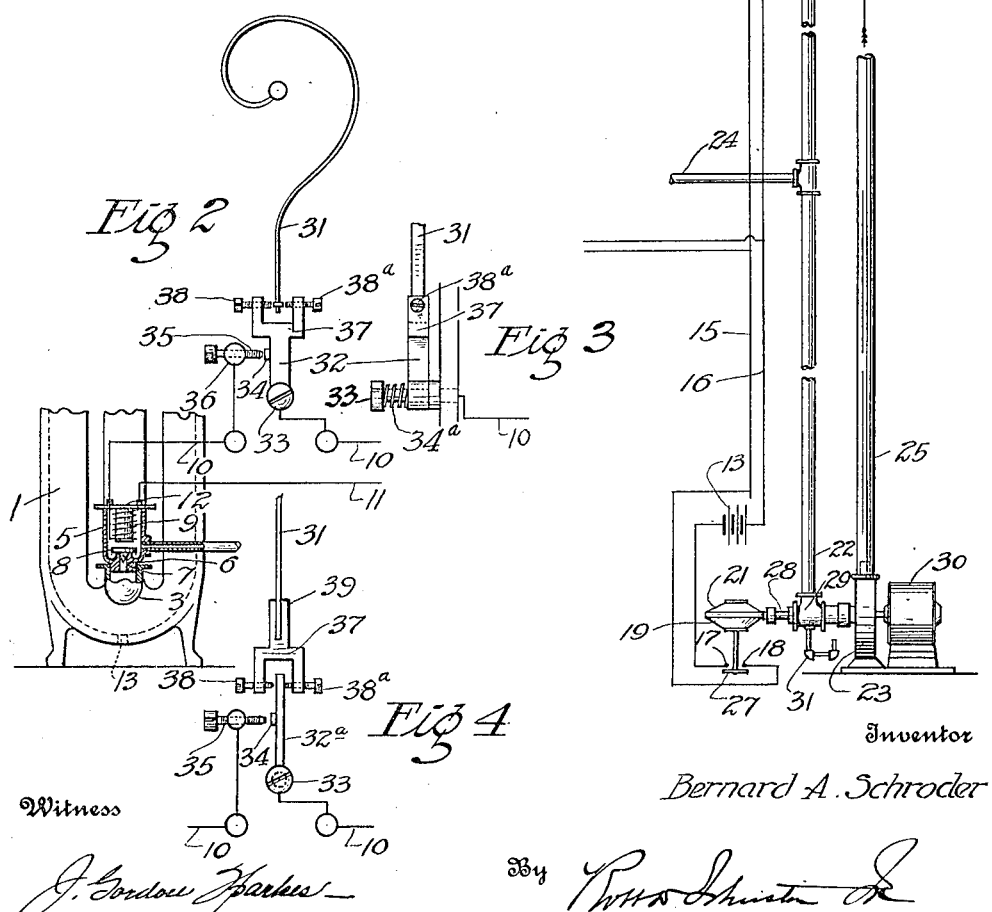
*Fig. 2*  *Fig. 3*  *Fig. 4*
Witness
J. Gordon Parkes
Inventor
Bernard A. Schroder
By
Attorney

UNITED STATES PATENT OFFICE.

BERNARD A. SCHRODER, OF BIRMINGHAM, ALABAMA, ASSIGNOR TO AUTOMATIC GAS RADIATOR COMPANY, A CORPORATION OF ALABAMA.

AUTOMATIC CONTROL MEANS FOR GAS-BURNING HEATING SYSTEMS.

1,280,872.      Specification of Letters Patent.      Patented Oct. 8, 1918.

Application filed January 27, 1916. Serial No. 74,650.

*To all whom it may concern:*

Be it known that I, BERNARD A. SCHRODER, a citizen of the United States of America, residing at Birmingham, in the county of Jefferson and State of Alabama, have invented certain new and useful Improvements in Automatic Control Means for Gas-Burning Heating Systems, of which the following is a specification.

The object of my invention is to simplify and perfect an automatic control means for opening and closing the gas supply valves of the radiators in a gas burning system for heating buildings.

My invention relates more particularly to systems utilizing gas burning radiators which have gas supply valves that are operated by electric motors in local circuits controlled by thermostatic make and break switches so that each switch and its controlled radiator or radiators will automatically maintain the desired temperature in the apartment in which they are located. It is my purpose to design the thermostatic make and break switch to control the gas supply valve for a radiator by means of a single point of contact. In the operation of such single point switches, the difficulty encountered has been that the apparatus is too sensitive and the very slight movement that will break the circuit will likewise in the reverse direction close the circuit. In fact, I have found in practice that the thermostatic switch mechanism is so sensitive in its operation as to cause the valve to chatter.

One object of this invention is to overcome this particular trouble by providing a lost-motion or "dead beat" attachment by means of which the thermostatic element will be required to traverse a predetermined distance before the switch can be opened or closed thereby, such predetermined distance determining the sensitiveness of the instrument and being adjustable in accordance with the duty required. An illustrative means to this end is the provision of a movable switch element which is controlled by the thermostatic element through a lost-motion connection effective for operating the switch responsive to a predetermined movement in either direction on the part of the thermostatic element.

Another feature of my invention relates to an automatic electric control system for heating installations, such for instance as is illustrated in my pending application Serial No. 7801, wherein the local thermostatic control circuits are in multiple with a master circuit controlled by a master switch that opens and closes responsive to the presence or absence of suction in the exhaust pipes of the radiator exhaust system. In an earlier pending application Serial No. 879,109, I show the master circuit energized by a motor generator set which operates the suction fan for the exhaust system. In either of these arrangements if two point contact thermostatic make and break switches are employed in local circuits, two control valves on the individual radiators are necessary, because, should the thermostat be working on the hot point contact and only one valve were used, such valve would necessarily be in open position and if the master circuit should be broken or deënergized under these conditions the valve would remain open and continue to supply gas to the radiator unless an additional valve means were interposed that would automatically close responsive to the breaking of the master circuit when the suction stops. Should the gas valves be left open under such conditions it is evident that the gas burning in the radiators would smother and raw gas would flow into the compartment in which the radiator is located as the suction means is out of service and ineffective to carry it off. The difference between the single circuit or two wire control which I use and the double circuit or three wire control which has heretofore been used, may be explained as follows:—

In the three wire control of the radiator valves in a suction exhaust gas burning heating system, if a double point, *i. e.*, hot and cold point, thermostat is employed for making and breaking the local valve circuits, two valves are necessary to control the gas to each radiator, one valve being responsive to the blower and the other valve being responsive to thermostatic conditions. It is therefore evident that in the event the suction controlled valve on the radiator were eliminated, the thermostatic controlled valve might continue to supply gas when the suction was off, with serious or fatal results. In my case where I use a single point thermostat in a single control circuit, by making such circuit responsive to a master control which is itself responsive to the suction, it is evident that a single magnet valve, adapted to close when the current supply is interrupted, will close automatically responsive to suction conditions irrespective of thermostatic conditions and therefore it is only necessary to provide one gas supply valve on each radiator and to control it by a two wire or grounded circuit.

The improvements I have made in the thermostatic control of a heater valve are obviously applicable to a variety of uses where it is a desideratum to definitely control the temperature variations necessary to cut an apparatus into and out of service, whether such apparatus be for heating or cooling or for other functions that are to be carried on under predetermined conditions of temperature, and regardless of the particular medium employed to actuate the control means for such apparatus.

As illustrative of my invention, reference is made to the accompanying drawings, in which:—

Figure 1 illustrates the general piping circuits and the electric control circuits of a gas burning heating system, only one radiator being shown connected up with the system for illustrative purposes.

Fig. 2 is a detail view of the thermostatic control means for the local circuits.

Fig. 3 is a partial side view of Fig. 2.

Fig. 4 is a detail view corresponding to Fig. 2 and showing a modified form of the "dead beat" or lost-motion actuating means for the switch.

Similar reference numerals refer to similar parts throughout the drawings.

In the embodiment of my invention illustrated, I show a sectional radiator having a burner 2 projecting through its bottom alining ports and leading from a Bunsen tube 3 of any suitable type. Gas is supplied to the burner by a pipe 4 entering a valve casing 5 within which is mounted a gravity seating valve 6 which controls an outlet port 7 to the burner and which has a top portion 8 which weights the valve to insure its seating and also serves as a core for the solenoid 9 which, when energized, will attract the core and open the valve. This solenoid is wound in series with its respective local circuit wires 10 and 11 and is attached to the top 12 of the valve casing 5 which carries the posts for the wires. The wire 10 has a thermostatic make and break apparatus 14 included therein and the wires 10 and 11 of each local circuit are connected in multiple to the wires 15, 16 forming the master control circuit which is energized by a battery 13 or from any other suitable source of electricity. This master circuit is open at the switch points 17 and 18 and is adapted to be opened or closed responsive to the position of a suction-controlled diaphragm 19 forming part of a casing 21 which is connected through a pipe 28 and coupling 29 to the exhaust piping system 22 adjacent to the suction fan 23, which serves to draw off the products of combustion through pipes 24 and 22 from the radiators and discharge the same to the atmosphere through pipe 25. The suction fan is driven by a motor 30 and, as long as the suction is on, the diaphragm 19 assumes a position by means of its contact plate 27 to close the master circuit across the contacts 17 and 18 and energize the local circuits 10 and 11 subject however to the secondary control of the thermostatic make and break devices 14. When the suction is off, the master control is broken. All of the mechanism so far described forms the subject matter of my pending applications above mentioned and is therefore not specifically claimed as a part of this invention, which concerns itself principally with the improved means for the thermostatic control of the valves 6, both separately and in combination with the suction master control.

The thermostatic make and break device comprises a thermostatic element 31 of well known commercial design formed of two metallic plates which expand and contract unequally, so that, responsive to temperature changes, the element will bend to one side or the other and swing its free end back and forth through a limited path of travel. Heretofore the practice has been to mount one contact point on the element itself but in my preferred construction (Fig. 2), the thermostatic element 31 has its free end adapted to operate a switch arm 32, pivoted on a stud 33 and held frictionally in its adjusted positions by means of a spring $34^a$. This switch arm 32 carries a contact point 34 which is adapted to engage an adjustable contact screw 35 mounted in a post 36. The switch arm 32 carries a yoke 37 into the arms of which are screwed opposed set screws 38 and $38^a$, which are disposed on each side of and adapted to be engaged by the thermostatic element 31. The relative adjustment of these screws determine the length of the lost-motion travel provided for the thermostatic element in throwing the switch arm 32. One side of the wire 10 is connected to the post 36 and the other side to the switch arm 32. In the modified form shown in Fig. 4, the yoke 37 with its adjustable set screws 38 and $38^a$ is provided with a socket 39 which is mounted on the free end of the thermostatic element 31. In this case the switch arm $32^a$ is formed by a straight bar, the free end of which works between the set screws in the yoke 37 and which carries the contact point 34 so as to make and break the circuit just as in the case of the switch arm 32.

In operation, assuming that the thermostatic element, by means of its pointer 40, has been set for any desired temperature by moving the pointer relative to the dial scale 41 in the manner well understood in the art, as the temperature rises, the element 31 swings to the right until it engages the contact 38ª, whereupon its further movement will break the contact between the points 34, 35 and open the local circuit, thus deënergizing the solenoid 9 and permitting the valve to seat and shut off the supply of gas to the radiator. The spring 34ª will hold the switch arm in the position to which it is thus moved. As the temperature of the surrounding compartment falls, the thermostatic element commences its swing to the left across the gap between the contact screws 38, 38ª until, after the predetermined temperature variation, it engages the screw 38, after which its further movement will shift the switch arm 32 and close the local circuit, whereupon the gas supply valve is opened and the radiator resumes service. The same operation actually takes place in the design shown in Fig. 4. The relative adjustment between the set screws 38, 38ª determines the sensitiveness of the make and break apparatus for the wider the set screws are spaced, the greater the rise or fall in temperature required to operate the valve. In practice, they are spaced generally so as to require a variation of two degrees in temperature before the thermostatic element will operate. It will be noted that regardless of the position of the secondary or thermostatic control of the local circuits, whenever the suction goes off and the master circuit is broken at the contacts 18, 19, all local valve solenoids 9 are instantly deënergized and the gas supply shut off to all the radiators, thereby making it impossible for a dangerous condition to arise in the operation of the system, due to any defect in either the electric control system or the suction system.

It will of course be understood that while I illustrate two wire electric circuits, it is contemplated that one side of the circuits may be grounded or returned by the piping and when I refer to a two wire circuit, I mean to include such equivalent arrangement, it being obvious that by devising an electric control operating on a two wire principle, I am enabled to materially simplify the control circuits in general and to reduce the cost of equipment and installation.

Having thus described my invention, what I claim as new and desire to secure by Letters Patent, is:—

1. In a gas burning heating system where each radiator is provided with a single normally seated valve for controlling its gas supply, an electric control system comprising a master circuit and a plurality of local circuits connected in multiple to the master circuit, each local circuit including a make and break switch, an electric device adapted, when energized, to open a radiator gas supply valve, a thermostat actuator for each make and break switch, means to establish a lost-motion operating connection between each thermostat and the switch controlled thereby, an exhaust piping system carrying off the products of combustion from the radiators, a means for inducing a positive draft through said exhaust system, and means operable when the induced exhaust draft is interrupted to open said master circuit.

2. In a gas heating system, in combination, radiators heated by gas burners having each a single self seating gas controlling valve, an exhaust piping system leading to the several radiators, a blower to induce a positive draft through said exhaust system, an electric master control circuit having a make and break switch, means to open said switch when the positive suction action in the exhaust piping system is interrupted, local circuits in multiple to said master circuit, electric means in each local circuit adapted, when energized, to open a radiator gas supply valve, a make and break switch in each local circuit, a thermostatic actuator for each local circuit switch, and a lost-motion connection between said actuator and its responsive switch, substantially as described.

3. In combination, a gas burning radiator having a self closing gas supply valve, of electric means to open the valve, comprising a solenoid, one single closed electric circuit to the solenoid, a make and break switch in said circuit, a source of electrical energy connected to said circuit, said make and break switch comprising a movable switch arm, means to frictionally hold said arm in its adjusted positions to open or close the circuit, a thermostatic device having a movable element, and a yokelike element forming an operating connection between said element and switch arm, said yokelike element providing a lost-motion connection whereby the thermostat sets said switch arm to hold said circuit open or closed, substantially as described.

4. In combination, a gas burning radiator having a self closing gas supply valve, of electric means to open the valve, comprising one solenoid, a single closed electric circuit to the solenoid, a make and break switch in said circuit, a source of electrical energy connected to said circuit, said make and break switch comprising a movable switch arm, means to frictionally hold said arm in its adjusted position to open and close the circuit, a thermostatic device having a movable element, and a yokelike element forming an operating connection between said movable element and switch arm, said yokelike element having oppositely disposed and relatively adjustable set screws providing an adjustable lost-motion connection whereby the thermostat sets said switch arm to hold said circuit open or closed, substantially as described.

In testimony whereof I affix my signature.

BERNARD A. SCHRODER.

Witness:
NOMIE WELSH.